(12) United States Patent
You et al.

(10) Patent No.: US 10,713,521 B2
(45) Date of Patent: Jul. 14, 2020

(54) IMAGE CAPTURING APPARATUS AND MANUFACTURING METHOD THEREOF

(71) Applicant: Gingy Technology Inc., Hsinchu (TW)

(72) Inventors: Kuo-Liang You, Hsinchu (TW);
Kuo-Wen Yang, Hsinchu (TW);
Cheng-Jyun Huang, Hsinchu (TW);
Yu-Cheng Chiu, Hsinchu (TW);
Hao-Hsiang Chang, Hsinchu (TW);
Chih-Chiang Yu, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 186 days.

(21) Appl. No.: 15/719,575

(22) Filed: Sep. 29, 2017

(65) Prior Publication Data

US 2018/0039849 A1    Feb. 8, 2018

Related U.S. Application Data

(63) Continuation-in-part of application No. 15/588,700, filed on May 8, 2017, now Pat. No. 10,455,129, and a continuation-in-part of application No. 15/399,704, filed on Jan. 5, 2017, now Pat. No. 10,356,296.

(Continued)

(30) Foreign Application Priority Data

Nov. 4, 2016    (TW) .............................. 105135846 A
Mar. 17, 2017    (CN) ..................... 2017 2 0260844 U (Continued)

(51) Int. Cl.
*G06K 9/46*    (2006.01)
*G06K 9/00*    (2006.01)

(52) U.S. Cl.
CPC ............. *G06K 9/46* (2013.01); *G06K 9/0004* (2013.01); *G06K 9/00053* (2013.01); *G06K 9/00892* (2013.01); *G06K 9/00013* (2013.01)

(58) Field of Classification Search
CPC .. G06K 9/00; G06K 9/00006; G06K 9/00013; G06K 9/00026; G06K 9/00046;
(Continued)

(56) References Cited

U.S. PATENT DOCUMENTS 5,177,802 A    1/1993    Fujimoto et al.
6,259,108 B1 *  7/2001    Antonelli ........... G06K 9/00026
                                                       250/556

(Continued)

FOREIGN PATENT DOCUMENTS

CN        1820272      8/2006
CN       105989340    10/2016
(Continued)

OTHER PUBLICATIONS

"Office Action of Taiwan Related Application, application No. 105135846", dated Nov. 17, 2017, p. 1-p. 9, in which the listed references were cited.

*Primary Examiner* — John Bedtelyon
(74) *Attorney, Agent, or Firm* — JCIPRNET

(57) ABSTRACT

An image capturing apparatus including a substrate, a light source, a sensor, a light shielding element, a first reflective element, and a transparent colloid curing layer is provided. The light source, the sensor, the light shielding element, the first reflective element, and the transparent colloid curing layer are disposed on the substrate. The sensor is located next to the light source. The light shielding element is located between the light source and the sensor. The first reflective element is located between the light shielding element and the sensor. The transparent colloid curing layer covers the light source, the sensor, the light shielding element, and the first reflective element. A manufacturing method of the image capturing apparatus is also provided.

23 Claims, 11 Drawing Sheets

Related U.S. Application Data

(60) Provisional application No. 62/413,974, filed on Oct. 27, 2016, provisional application No. 62/371,230, filed on Aug. 5, 2016.

(30) Foreign Application Priority Data

Jun. 29, 2017 (TW) .............................. 106121692 A
Jul. 25, 2017 (CN) ..................... 2017 1 0612541 U

(58) Field of Classification Search
CPC .. G06K 9/00053; G06K 9/00892; G06K 9/20; G06K 9/22; G06K 9/24; G06K 9/36; G06K 9/46; G06K 9/4604; G06K 9/00087; G02B 6/0031; G02B 27/0977; H01L 27/14629

See application file for complete search history.

(56) References Cited

U.S. PATENT DOCUMENTS

| | | |
|---|---|---|
| 6,927,844 B2 | 8/2005 | Higuchi et al. |
| 10,185,866 B2 * | 1/2019 | Goodelle ........... G06K 9/00053 |
| 2016/0117543 A1 | 4/2016 | Huang et al. |
| 2016/0162724 A1 | 6/2016 | Hsiao et al. |
| 2017/0083745 A1 | 3/2017 | Goodelle et al. |
| 2017/0091506 A1 | 3/2017 | Sinha et al. |

FOREIGN PATENT DOCUMENTS

| | | |
|---|---|---|
| CN | 106022325 | 10/2016 |
| TW | 200641701 | 12/2006 |
| TW | 200644605 | 12/2006 |
| TW | 200825943 | 6/2008 |
| TW | 201419165 | 5/2014 |
| TW | I444904 | 7/2014 |
| TW | I517054 | 1/2016 |
| TW | 201626516 | 7/2016 |
| TW | I545492 | 8/2016 |
| TW | M532056 | 11/2016 |
| TW | I567834 | 1/2017 |
| TW | M537678 | 3/2017 |
| TW | M544023 | 6/2017 |
| TW | M544047 | 6/2017 |
| TW | M544048 | 6/2017 |
| WO | 2016176986 | 11/2016 |

* cited by examiner

IMAGE CAPTURING APPARATUS AND MANUFACTURING METHOD THEREOF

CROSS-REFERENCE TO RELATED APPLICATION

This application is a continuation-in-part application of and claims the priority benefit of a prior application Ser. No. 15/588,700, filed on May 8, 2017, now pending, which claims the priority benefits of U.S. provisional application Ser. No. 62/371,230, filed on Aug. 5, 2016, U.S. provisional application Ser. No. 62/413,974, filed on Oct. 27, 2016, and China application serial no. 201720260844.9, filed on Mar. 17, 2017. This application is also a continuation-in-part application of and claims the priority benefit of a prior application Ser. No. 15/399,704, filed on Jan. 5, 2017, now pending, which claims the priority benefits of U.S. provisional application Ser. No. 62/371,230, filed on Aug. 5, 2016, U.S. provisional application Ser. No. 62/413,974, filed on Oct. 27, 2016, and Taiwan application serial no. 105135846, filed on Nov. 4, 2016. This application also claims the priority benefits of Taiwan application serial no. 106121692, filed on Jun. 29, 2017, and China application serial no. 201710612541.3, filed on Jul. 25, 2017. The entirety of each of the above patent applications is hereby incorporated by reference herein and made a part of this specification.

BACKGROUND OF THE INVENTION

Field of the Invention

The invention relates to an optoelectronic apparatus and a manufacturing method thereof, and in particular, an image capturing apparatus and a manufacturing method thereof.

Description of Related Art

The types of biometric identification include identification of a face, a voice, an iris, a retina, a vein, a palm print, a fingerprint, etc. According to the sensing method, biometric identification apparatuses are classified as an optical type, a capacitive type, an ultrasonic type, and a thermosensitive type. Generally, an optical-type biometric identification apparatus includes a light source, a light guide element, and a sensor. A beam emitted by the light source is irradiated to an object pressed on the light guide element, and the sensor receives the beam reflected by the object to perform a biometric identification.

Taking fingerprint identification as an example, when a finger is pressed on the light guide element, a raised portion of the fingerprint is in contact with the light guide element, and a recessed portion of the fingerprint is not in contact with the light guide element. Therefore, the raised portion of the fingerprint destroys total internal reflection of the beam in the light guide element, so that the sensor can obtain dark fringes corresponding to the raised portion. Meanwhile, the recessed portion of the fingerprint does not destroy total internal reflection of the beam in the light guide element, so that the sensor can obtain bright fringes corresponding to the recessed portion. Thereby, the beams corresponding to the raised portion and the recessed portion of the fingerprint form dark-bright striped patterns on a light-receiving surface of the sensor. Information corresponding to the fingerprint image is calculated through algorithms, and then identity of a user can be identified.

Since the light source in the optical-type biometric identification apparatus is disposed next to the sensor, large-angle beams emitted by the light source may directly irradiate to the sensor and cause interference. If a light shielding element is disposed between the light source and the sensor to reduce interference, transmission of the beam may be affected and the finger may not be uniformly irradiated by the beam, which causes negative impact on image capturing quality of the image capturing apparatus.

SUMMARY OF THE INVENTION

The invention provides an image capturing apparatus that exhibits excellent image capturing quality.

The invention provides a manufacturing method of an image capturing apparatus that incurs low costs.

An image capturing apparatus of the invention includes a substrate, a light source, a sensor, a light shielding element, a first reflective element, and a transparent colloid curing layer. The light source, the sensor, the light shielding element, the first reflective element, and the transparent colloid curing layer are disposed on the substrate. The sensor is located next to the light source. The light shielding element is located between the light source and the sensor. The first reflective element is located between the light shielding element and the sensor. The transparent colloid curing layer covers the light source, the sensor, the light shielding element, and the first reflective element.

A manufacturing method of an image capturing apparatus of the invention includes the following steps: disposing a light source, a sensor, a light shielding element, and a first reflective element on a substrate, wherein the sensor is located next to the light source, the light shielding element is located between the light source and the sensor, and the first reflective element is located between the light shielding element and the sensor; and forming a transparent colloid curing layer on the substrate, wherein the transparent colloid curing layer covers the light source, the sensor, the light shielding element, and the first reflective element.

In light of the above, in the image capturing apparatus of an exemplary embodiment of the invention, since the light shielding element is disposed between the light source and the sensor, the beam from the light source is prevented from directly irradiating to the sensor. Moreover, since the first reflective element and the top surface of the transparent colloid curing layer contribute to multiple reflections of the beam in the transparent colloid curing layer, the beam transmitted in the image capturing apparatus is more uniformized, and the object thereby receives light in a more uniform manner. Accordingly, the image capturing apparatus of an embodiment of the invention exhibits excellent image capturing quality. Moreover, in the manufacturing method of the image capturing apparatus of an embodiment of the invention, since the light source, the light shielding element, the first reflective element, and the sensor occupy a certain amount of space, the amount of the transparent colloid required is reduced, which thereby lowers the manufacturing costs.

To provide a further understanding of the aforementioned and other features and advantages of the disclosure, exemplary embodiments, together with the reference drawings, are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
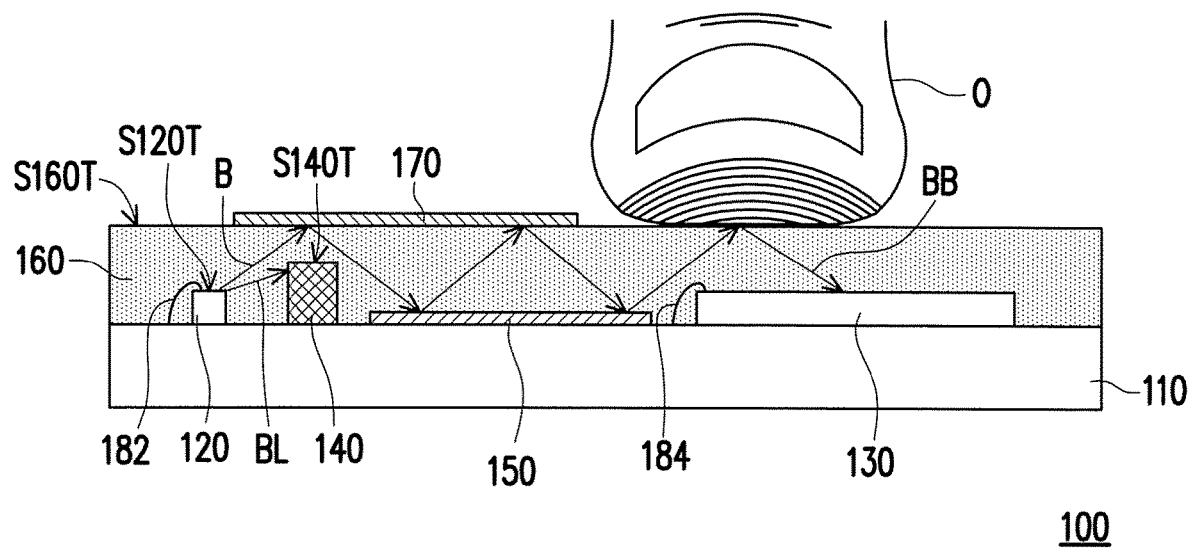
FIG. 1 is a cross-sectional schematic diagram illustrating one aspect of an image capturing apparatus according to a first embodiment of the invention.

The foregoing and other technical content, features, and effects of the invention will be clearly presented in the following detailed description of the embodiments with reference to the reference drawings. Directional terminology, such as "upper", "lower", "front", "back", "left", "right", etc., mentioned in the exemplary embodiments below is used with reference to the orientation of the drawings attached. Therefore, the directional terminology is used to illustrate rather than limit the invention. Moreover, in any of the embodiments below, the same or similar components will be labeled with the same or similar reference numerals.

FIG. 1 is a cross-sectional schematic diagram illustrating one aspect of an image capturing apparatus according to a first embodiment of the invention. Referring to FIG. 1, an image capturing apparatus 100 is adapted to capture a biometric feature of an object O. In the exemplary embodiment, the object O is, for example, a finger, and the biometric feature is, for example, a fingerprint or a vein, but the invention is not limited hereto. For example, in another embodiment, the object O may also be a palm, and the biometric feature may be a palm print.

The image capturing apparatus 100 includes a substrate 110, a light source 120, a sensor 130, a light shielding element 140, a first reflective element 150, a transparent colloid curing layer 160, and a second reflective element 170.

The substrate 110 is used as a carrier board of the foregoing components, and the substrate 110 may include a circuit. For example, the substrate 110 is a printed circuit board (PCB), a flexible printed circuit board (FPCB), a glass carrier board including a circuit, or a ceramic substrate including a circuit, but is not limited hereto.

The light source 120 is disposed on the substrate 110, and the light source 120 is electrically connected to the circuit on the substrate 110. For example, the image capturing apparatus 100 further includes a connecting line (also known as connecting wire) 182, and the light source 120 is electrically connected to the circuit on the substrate 110 via the connecting line 182, but the invention is not limited hereto. The light source 120 is adapted to provide a beam B for illuminating the object O. The light source 120 may include one or more light emitting elements. The light emitting element is, for example, a light emitting diode, a laser diode, or a combination of the two. Moreover, the beam B is, for example, visible light, non-visible light, or a combination of the two. The non-visible light is, for example, infrared light but is not limited hereto.

The sensor 130 is disposed on the substrate 110 and is located next to the light source 120. Moreover, the sensor 130 is electrically connected to the circuit on the substrate 110. For example, the image capturing apparatus 100 further includes a connecting line 184, and the sensor 130 is electrically connected to the circuit on the substrate 110 via the connecting line 184, but the invention is not limited hereto. The sensor 130 is adapted to receive a portion (e.g., a beam BB) of the beam B reflected by the object O. For example, the sensor 130 is a charge coupled device (CCD), a complementary metal-oxide semiconductor (CMOS) device, or another adequate image-sensing device. In addition, the sensor 130 may be the photoelectron sensor described in the prior application Ser. No. 14/835,130 filed by the Applicant.

Figure 2:
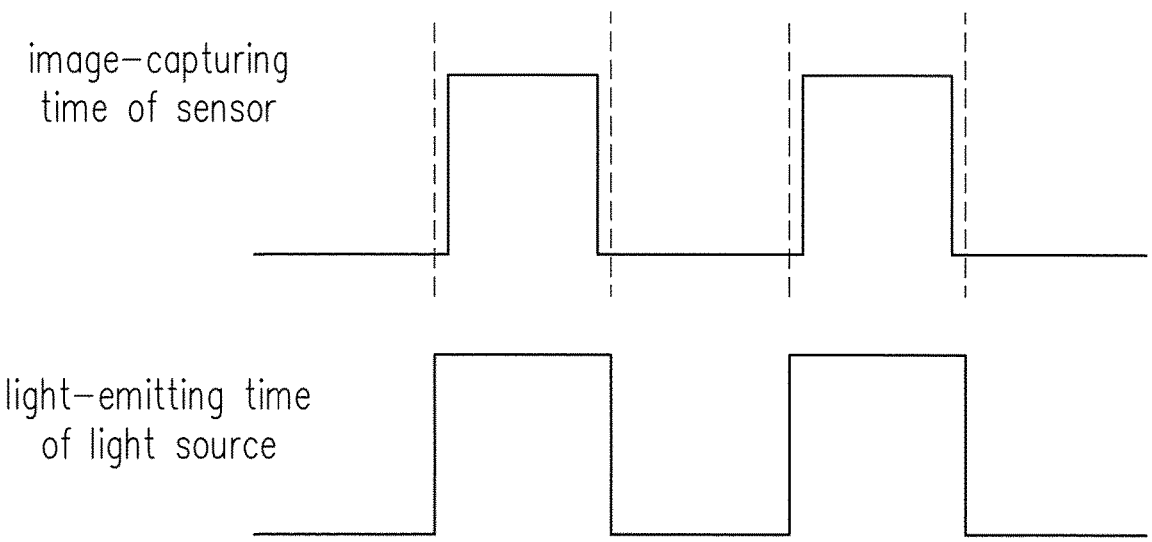
FIG. 2 is a schematic diagram illustrating a light-emitting time of a light source and an image-capturing time of a sensor.

In an embodiment, a pulse width modulation circuit is integrated in the sensor 130. FIG. 2 is a schematic diagram illustrating a light-emitting time of the light source and an image-capturing time of the sensor in FIG. 1. Referring to FIG. 2, the light-emitting time of the light source 120 and the image-capturing time of the sensor 130 are controlled by the pulse width modulation circuit so that the light-emitting time of the light source 120 is synchronized with the image-capturing time of the sensor 130 so as to achieve the effect of precise control, but the invention is not limited hereto.

Referring to FIG. 1 again, the light shielding element 140 is disposed on the substrate 110 and is located between the light source 120 and the sensor 130. The light shielding element 140 is adapted to shield a large-angle beam (e.g., a beam BL) emitted by the light source 120 to avoid interference caused by the large-angle beam directly irradiated to the sensor 130. For example, the light shielding element 140 is made of a light-absorbing material or is formed by forming a light-absorbing layer on a transparent bulk material. Moreover, a height of the light shielding element 140 may be greater than or equal to a height of the light source 120 and may be smaller than a height of the transparent colloid curing layer 160. In other words, a top surface S140T of the light shielding element 140 may be higher than a top surface S120T of the light source 120 or is flush with the top surface S120T of the light source 120. In addition, the top surface S140T of the light shielding element 140 is lower than a top surface S160T of the transparent colloid curing layer 160 to allow a partial beam (e.g., the beam B) emitted by the light source 120 to pass through.

The first reflective element 150 is disposed on the substrate 110 and is located between the light shielding element 140 and the sensor 130. The first reflective element 150 is adapted to reflect the beam B transmitted towards the substrate 110, such that the beam B is transmitted in a direction away from the substrate 110. For example, the first reflective element 150 is a reflective plate or is a reflecting layer formed on the substrate 110 by at least one of electroplating, printing, etching, adhesion, and coating.

The transparent colloid curing layer 160 is disposed on the substrate 110 and covers the light source 120, the sensor 130, the light shielding element 140, and the first reflective element 150. The transparent colloid curing layer 160 is, for example, formed by curing a transparent colloid in a heating process or a light irradiation process. The transparent colloid is, for example, an epoxy, a silicone gel, an optical gel, a resin, or another adequate transparent material.

The second reflective element 170 is disposed above the light shielding element 140 and is located between the light source 120 and the sensor 130. Specifically, the second reflective element 170 is located on at least a transmission path of the beam B that comes from the light source 120 and is not shielded by the light shielding element 140 to reflect the beam B transmitted towards the top surface S160T of the transparent colloid curing layer 160, such that the beam B is transmitted towards the first reflective element 150. For example, the second reflective element 170 is a reflective plate or is a reflecting layer formed on the transparent colloid curing layer 160 by at least one of electroplating, printing, etching, adhesion, and coating.

In the exemplary embodiment, the second reflective element 170 is disposed on the top surface S160T of the transparent colloid curing layer 160 but is not limited hereto. The second reflective element 170 may extend from above the light shielding element 140 towards above the first reflective element 150, and the second reflective element 170 exposes the sensor 130. The second reflective element 170 may partially overlap with the first reflective element 150 but is not limited hereto. In another embodiment, the second reflective element 170 and the first reflective element 150 fully overlap or do not overlap with each other. Moreover, the first reflective element 150 and the second reflective element 170 may have the same or different reflectivities.

Since the first reflective element 150 and the second reflective element 170 contribute to multiple reflections of the beam B in the transparent colloid curing layer 160, the beam B transmitted in the image capturing apparatus 100 is more uniformized, and the object O thereby receives light in a more uniform manner, which leads the sensor 130 to capture a complete biometric feature image. Accordingly, the image capturing apparatus 100 exhibits excellent image capturing quality.

In the exemplary embodiment, the object O is directly pressed on the top surface S160T of the transparent colloid curing layer 160 to perform a biometric identification. In an embodiment, the image capturing apparatus 100 further includes a protective cover plate (not illustrated) or a protective film (not illustrated). The protective cover plate or the protective film is disposed on the transparent colloid curing layer 160 and the second reflective element 170, and the object O is pressed on a surface of the protective cover plate or the protective film away from the second reflective element 170 to perform the biometric identification. The protective cover plate or the protective film protects the transparent colloid curing layer 160 and the second reflective element 170 located below against scratching, for example.

FIG. 3 to FIG. 7 are cross-sectional schematic diagrams respectively illustrating other aspects of the image capturing apparatus according to the first embodiment, wherein the same components are represented by the same numerals and will not be repeatedly described below.

Figure 3:
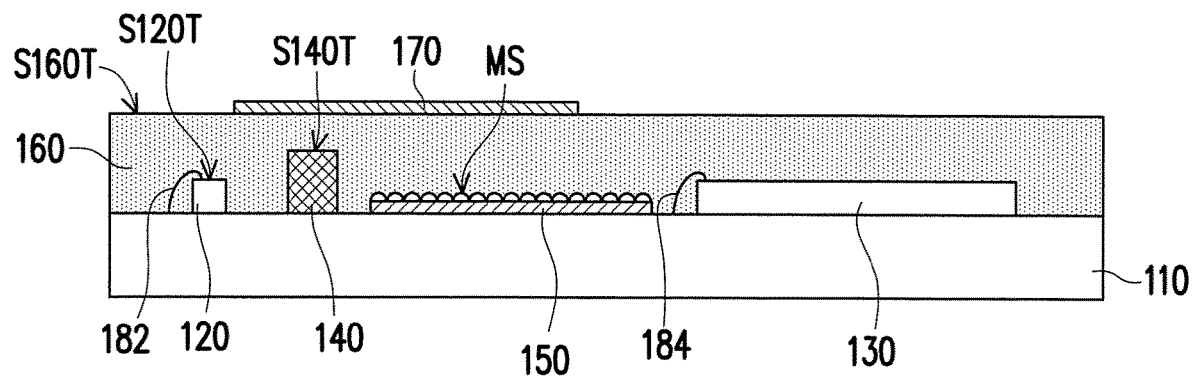
FIG. 3 to FIG. 7 are cross-sectional schematic diagrams illustrating other aspects of the image capturing apparatus according to the first embodiment.

Referring to FIG. 3, the main differences between an image capturing apparatus 100A and the image capturing apparatus 100 of FIG. 1 are described below. In the image capturing apparatus 100A, a plurality of microstructures MS may be formed on the surface of at least one of the substrate 110, the first reflective element 150, the transparent colloid curing layer 160, and the second reflective element 170 to increase a reflection amount of the beam B and cause the beam B to be more uniformized. FIG. 3 schematically illustrates a plurality of microstructures MS formed on the surface of the first reflective element 150 away from the substrate 110, but the invention is not limited hereto. In another embodiment, the plurality of microstructures MS are formed on a region of the substrate 110 other than the region disposed with the foregoing components. The top surface S160T of the transparent colloid curing layer 160 may be formed with the plurality of microstructures MS, and the second reflective element 170 is disposed on at least a portion of the plurality of microstructures MS. The surface of the second reflective element 170 facing the substrate 110 or the surface away from the substrate 110 may be formed with the plurality of microstructures MS.

It is noted that the plurality of microstructures MS may be thoroughly or partially disposed on the foregoing components, and the plurality of microstructures MS may be disposed on the foregoing components continuously or at an interval. Moreover, in any one implementable exemplary embodiment of the invention, the plurality of microstructures MS may be disposed on the first reflective element 150 or the second reflective element 170 by partial attachment. For example, the plurality of microstructures MS and the first reflective element 150 (or the second reflective element 170) may be attached to each other through an annular adhesive layer (not illustrated), wherein the annular adhesive layer is located between a portion of the plurality of microstructures MS and a portion of the first reflective element 150 (or the second reflective element 170), and the adhesive layer is not disposed between the other portion of the plurality of microstructures MS and the other portion of the first reflective element 150 (or the second reflective element 170), such that the plurality of microstructures MS, the annular adhesive layer, and the first reflective element 150 (or the second reflective element 170) enclose and form an air gap layer (not illustrated).

In the framework of FIG. 3, the image capturing apparatus 100A may further include at least one protective cover plate (also known as transparent sheet), at least one cover sheet (not illustrated) or at least one protective film (not illustrated) disposed on the transparent colloid curing layer 160 and the second reflective element 170. Reference may be made to the relevant paragraphs above for relevant descriptions, which will not be repeated here.

Figure 4:
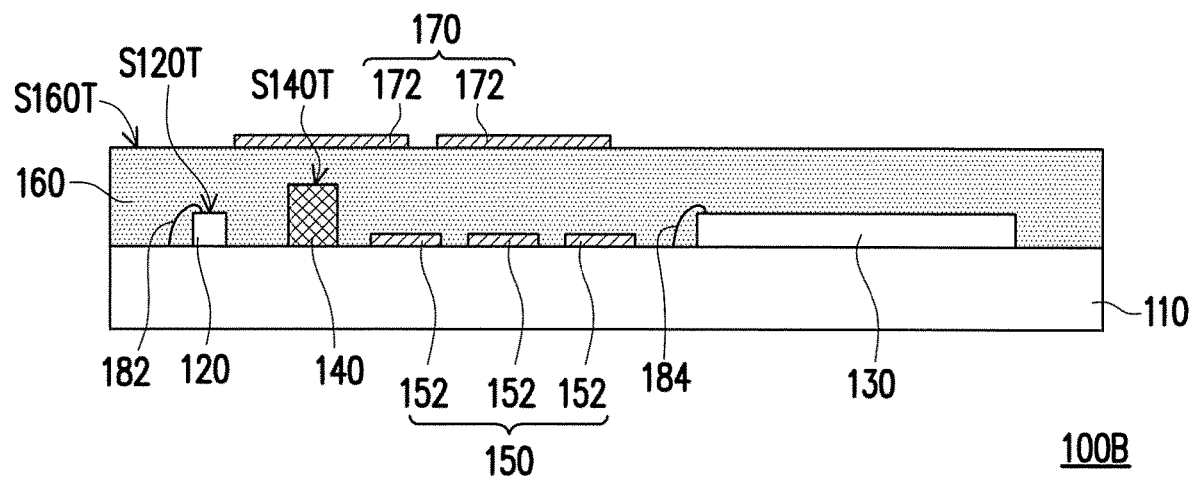

Referring to FIG. 4, the main differences between an image capturing apparatus 100B and the image capturing apparatus 100 of FIG. 1 are described below. In the image capturing apparatus 100B, the first reflective element 150 includes a plurality of light-reflecting elements 152 arranged at an interval, and the second reflective element 170 includes a plurality of light-reflecting elements 172 arranged at an interval. Specifically, the first reflective element 150 and the second reflective element 170 are respectively composed of one or more light-reflecting elements (e.g., one or more reflective plates or one or more reflecting layers). When the reflective element is composed of a plurality of light-reflecting elements, the light-reflecting elements may be arranged at an interval. The arrangement at an interval includes arrangement at an equal interval and arrangement at unequal intervals (random distribution). In another exemplary embodiment, only one of the first reflective element 150 and the second reflective element 170 includes the plurality of light-reflecting elements arranged at an interval.

In the framework of FIG. 4, the image capturing apparatus 100B may further include a protective cover plate (not illustrated) or a protective film (not illustrated) disposed on the transparent colloid curing layer 160 and the second reflective element 170. Moreover, a plurality of microstructures MS (see FIG. 3) may be formed on the surface of at least one of the substrate 110, the first reflective element 150 (the light-reflecting elements 152), the transparent colloid curing layer 160, and the second reflective element 170 (the light-reflecting elements 172). Reference may be made to the relevant paragraphs above for relevant descriptions, which will not be repeated here.

Figure 5:
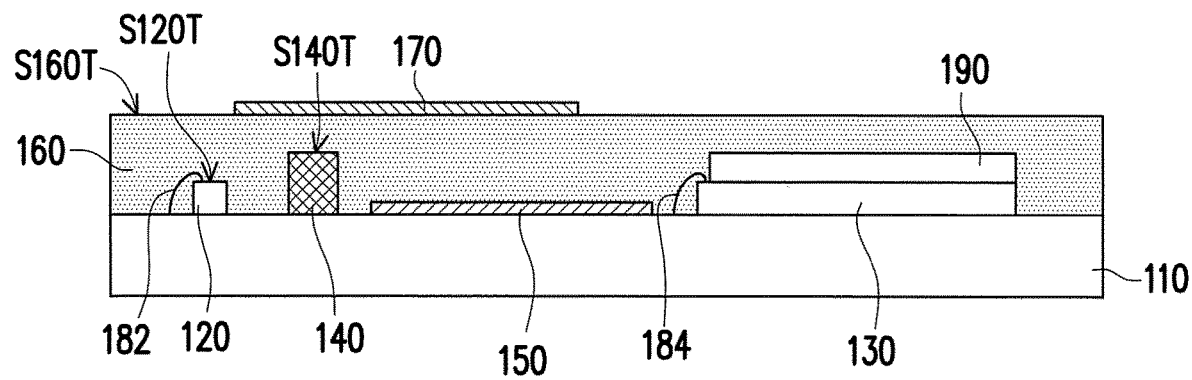

Referring to FIG. 5, the main differences between an image capturing apparatus 100C and the image capturing apparatus 100 of FIG. 1 are described below. In the image capturing apparatus 100C, the image capturing apparatus 100C further includes an optical collimator 190 disposed on the sensor 130 and located between the transparent colloid curing layer 160 and the sensor 130. The optical collimator 190 is adapted to collimate the beam transmitted to the sensor 130. In another embodiment, the optical collimator 190 is replaced by a grating. Moreover, the optical collimator 190 and the grating may be fixed on the sensor 130 through an adhesive layer (not illustrated) or a fixing mechanism (not illustrated). Alternatively, the optical collimator 190 may be replaced by a fiber array described in the prior application Ser. No. 15/151,471 filed by the Applicant.

In the framework of FIG. 5, the image capturing apparatus 100C may further include a protective cover plate (not illustrated) or a protective film (not illustrated) disposed on the transparent colloid curing layer 160 and the second reflective element 170. Moreover, a plurality of microstructures MS (see FIG. 3) may be formed on the surface of at least one of the substrate 110, the first reflective element 150, the transparent colloid curing layer 160, and the second reflective element 170. In addition, at least one of the first reflective element 150 and the second reflective element 170 may include a plurality of light-reflecting elements arranged at an interval (see FIG. 4). Reference may be made to the relevant paragraphs above for relevant descriptions, which will not be repeated here.

Figure 6:
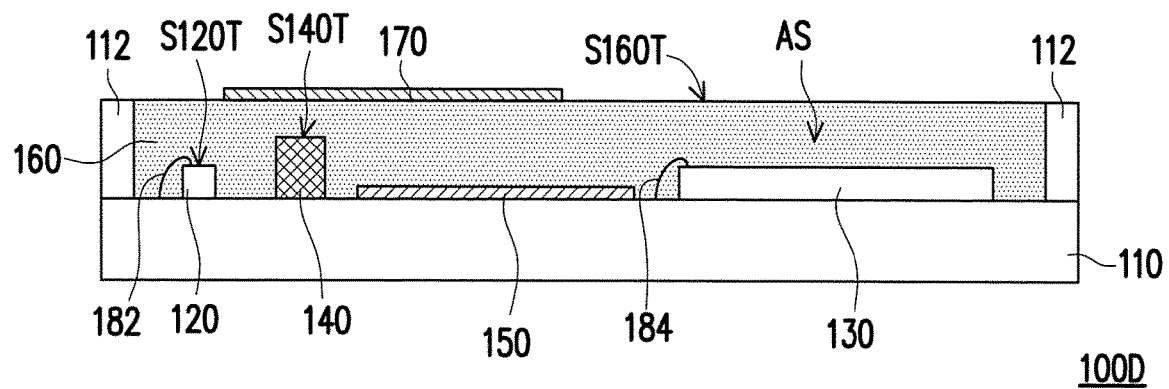

Referring to FIG. 6, the main differences between an image capturing apparatus 100D and the image capturing apparatus 100 of FIG. 1 are described below. In the image capturing apparatus 100D, the image capturing apparatus 100D further includes a wall structure (also known as protective structure) 112. The wall structure 112 is disposed on the substrate 110, wherein the wall structure 112 and the substrate 110 form an accommodation space AS for accommodating the light source 120, the sensor 130, the light shielding element 140, and the first reflective element 150. In an exemplary embodiment, the wall structure 112 and the substrate 110 may be integrally formed. For example, the wall structure 112 and the substrate 110 are formed by removing a block from a substrate material, wherein a space occupied by the block before removal is the accommodation space AS. In another exemplary embodiment, the wall structure 112 is fixed on the substrate 110 through a mechanic element or an adhesive layer (not illustrated), and the wall structure 112 and the substrate 110 may have the same or different materials.

In the framework of FIG. 6, the image capturing apparatus 100D may further include a protective cover plate (not illustrated) or a protective film (not illustrated) disposed on the transparent colloid curing layer 160 and the second reflective element 170. Moreover, a plurality of microstructures MS (see FIG. 3) may be formed on the surface of at least one of the substrate 110, the first reflective element 150, the transparent colloid curing layer 160, and the second reflective element 170. In addition, at least one of the first reflective element 150 and the second reflective element 170 may include a plurality of light-reflecting elements arranged at an interval (see FIG. 4). Furthermore, the image capturing apparatus 100D may further include an optical collimator 190 (see FIG. 5), a grating or a fiber array (described in the prior application Ser. No. 15/151,471 filed by the Applicant) disposed on the sensor 130 and located between the transparent colloid curing layer 160 and the sensor 130. Reference may be made to the relevant paragraphs above for relevant descriptions, which will not be repeated here.

Figure 7:
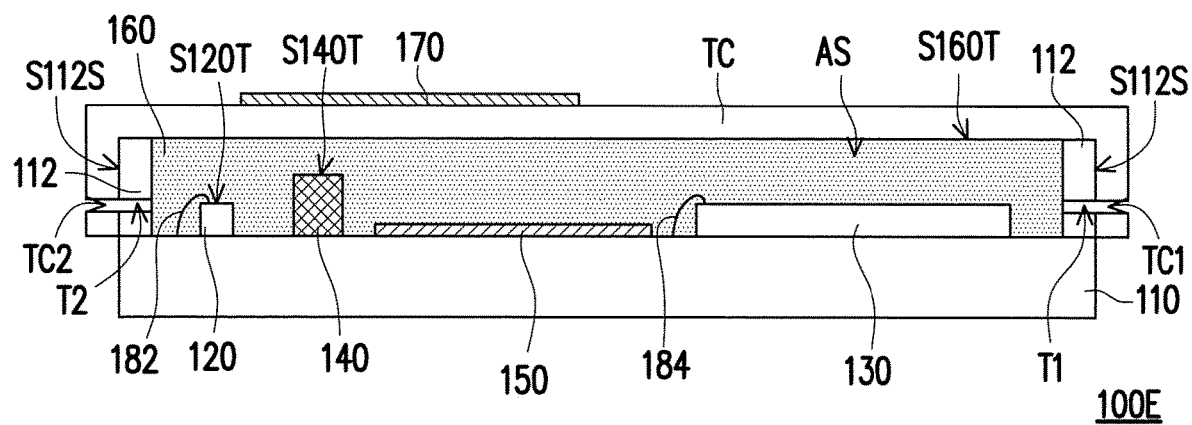

Referring to FIG. 7, the main differences between an image capturing apparatus 100E and the image capturing apparatus 100D of FIG. 6 are described below. In the image capturing apparatus 100E, the image capturing apparatus 100E further includes a transparent cover TC. The transparent cover TC is disposed on the transparent colloid curing layer 160 and covers the light source 120, the sensor 130, the light shielding element 140, the first reflective element 150, the connecting line (also known as connecting wire) 182, the connecting line 184, and the wall structure 112. Moreover, the second reflective element 170 is disposed on the transparent cover TC.

The transparent cover TC includes a gel injection hole TC1 and a vacuum-pumping hole TC2. The gel injection hole TC1 is adapted to fill the transparent colloid for forming the transparent colloid curing layer 160, and the vacuum-pumping hole TC2 is adapted to connect to a vacuum-pumping apparatus to pump out air in the accommodation space AS when the transparent colloid is filled in.

In the exemplary embodiment, the transparent cover TC further covers a side wall surface S112S of the wall structure 112, and the gel injection hole TC1 and the vacuum-pumping hole TC2 are respectively formed in a portion of the transparent cover TC covering the side wall surface S112S of the wall structure 112. The wall structure 112 includes a first through-hole T1 and a second through-hole T2. The first through-hole T1 and the second through-hole T2 are respectively formed in portions of the wall structure 112 located on two opposite sides of the substrate 110, wherein the first through-hole T1 is connected to the gel injection hole TC1, and the second through-hole T2 is connected to the vacuum-pumping hole TC2. However, the invention is not limited hereto. The gel injection hole TC1 and the vacuum-pumping hole TC2 may be formed in a portion of the top of the transparent cover TC located on the substrate 110, so that it is not necessary to form the first through-hole T1 and the second through-hole T2 in the wall structure 112.

In the framework of FIG. 7, the image capturing apparatus 100E may further include a protective cover plate, a cover sheet (not illustrated) or a protective film (not illustrated) disposed on the transparent cover TC and the second reflective element 170. Moreover, a plurality of microstructures MS (see FIG. 3) may be formed on the surface of at least one of the substrate 110, the first reflective element 150, the transparent colloid curing layer 160, and the second reflective element 170. In addition, at least one of the first reflective element 150 and the second reflective element 170 may include a plurality of light-reflecting elements arranged at an interval (see FIG. 4). Furthermore, the image capturing apparatus 100E may further include an optical collimator 190 (see FIG. 5), a grating or a fiber array (described in the prior application Ser. No. 15/151,471 filed by the Applicant) disposed on the sensor 130 and located between the transparent colloid curing layer 160 and the sensor 130. Reference may be made to the relevant paragraphs above for relevant descriptions, which will not be repeated here.

Figure 8:
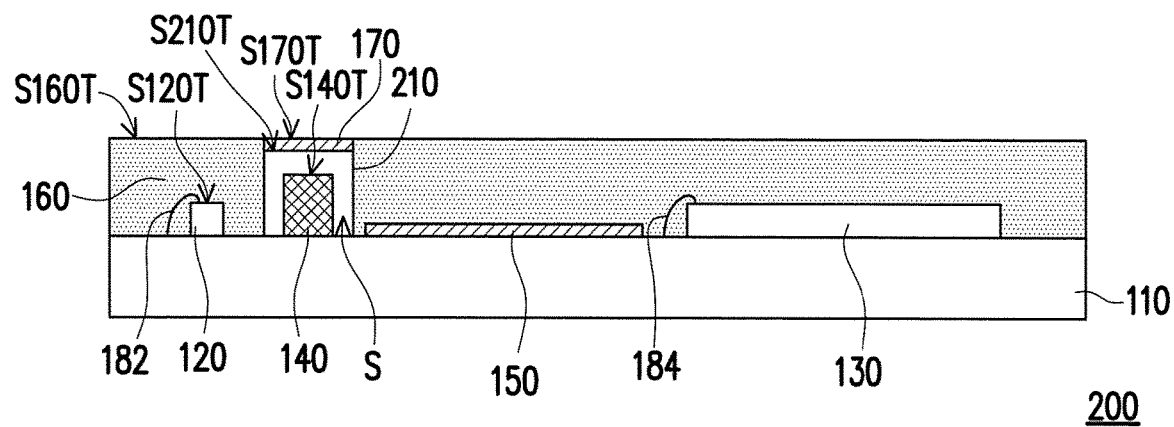
FIG. 8 is a cross-sectional schematic diagram illustrating one aspect of an image capturing apparatus according to a second embodiment of the invention.

FIG. 8 is a cross-sectional schematic diagram illustrating one aspect of an image capturing apparatus according to a second exemplary embodiment of the invention. Referring to FIG. 8, an image capturing apparatus 200 is similar to the image capturing apparatus 100 of FIG. 1, wherein the same components are represented by the same numerals and will not be repeatedly described below. The main differences between the image capturing apparatus 200 and the image capturing apparatus 100 of FIG. 1 are described below. In the image capturing apparatus 200, the image capturing apparatus 200 further includes a transparent base 210. The transparent base 210 is disposed on the substrate 110 and covers the light shielding element 140.

In the exemplary embodiments, the transparent base 210 is a transparent housing disposed to cover the light shielding element 140, and the transparent housing and the substrate 110 form an enclosed space S for accommodating the light shielding element 140. The light shielding element 140 may not fully fill the enclosed space S. In other words, a gap may exist between the light shielding element 140 and the transparent housing. The gap may be filled with an adhesive material for fixing the light shielding element 140 and the transparent housing but is not limited hereto. In another feasible embodiment, the transparent base 210 is a transparent layer formed on a side wall surface and a top surface of the light shielding element 140 by at least one of electroplating, printing, etching, adhesion, and coating, and the transparent layer may be made of one or more transparent materials.

In the exemplary embodiments, the transparent base 210 does not cover the first reflective element 150. In other words, the transparent base 210 does not overlap with the first reflective element 150. However, the invention is not limited hereto. In another embodiment, the transparent base 210 covers a portion of the first reflective element 150 adjacent to the transparent base 210, such that the transparent base 210 partially overlaps with the first reflective element 150.

The second reflective element 170 is disposed on a top surface S210T of the transparent base 210, wherein the top surface S170T of the second reflective element 170 is flush with the top surface S160T of the transparent colloid curing layer 160. In other words, the top surface S170T of the second reflective element 170 and the top surface S160T of the transparent colloid curing layer 160 have the same height, but the invention is not limited hereto. In another embodiment, the top surface S170T of the second reflective element 170 is lower than the top surface S160T of the transparent colloid curing layer 160, and the transparent colloid curing layer 160 further covers the second reflective element 170 and the transparent base 210 located under the second reflective element 170.

In the framework of FIG. 8, the image capturing apparatus 200 may further include a protective cover plate (or a protective cover sheet, not illustrated) or a protective film (not illustrated) disposed on the transparent colloid curing layer 160 and the second reflective element 170. Moreover, a plurality of microstructures MS (see FIG. 3) may be formed on the surface of at least one of the substrate 110, the first reflective element 150, the transparent colloid curing layer 160, and the second reflective element 170. In addition, at least one of the first reflective element 150 and the second reflective element 170 may include a plurality of light-reflecting elements arranged at an interval (see FIG. 4). Furthermore, the image capturing apparatus 200 may further include an optical collimator 190 (see FIG. 5) or a grating disposed on the sensor 130 and located between the transparent colloid curing layer 160 and the sensor 130. Moreover, the image capturing apparatus 200 may further include a wall structure 112 (see FIG. 6). Reference may be made to the relevant paragraphs above for relevant descriptions, which will not be repeated here.

Figure 9:
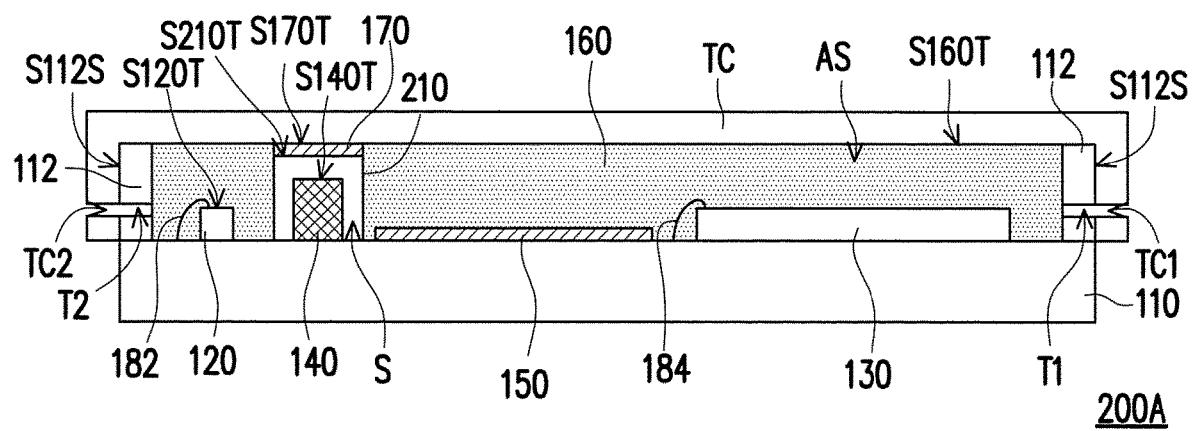
FIG. 9 is a cross-sectional schematic diagram illustrating another aspect of the image capturing apparatus according to the second embodiment.

FIG. 9 is a cross-sectional schematic diagram illustrating another aspect of the image capturing apparatus according to the second embodiment. Referring to FIG. 9, an image capturing apparatus 200A is similar to the image capturing apparatus 200 of FIG. 8, wherein the same components are represented by the same numerals and will not be repeatedly described below. The main differences between the image capturing apparatus 200A and the image capturing apparatus 200 of FIG. 8 are described below. In the image capturing apparatus 200A, the image capturing apparatus 200A further includes the wall structure 112 (also known as protective structure) and the transparent cover TC. Reference may be made to the relevant paragraphs above for relevant descriptions of the wall structure 112 and the transparent cover TC, which will not be repeated here.

In the framework of FIG. 9, the transparent cover TC protects the transparent colloid curing layer 160 and the second reflective element 170 located below. Therefore, it is not necessary to additionally dispose a protective cover plate or a protective film. Moreover, a plurality of microstructures MS (see FIG. 3) may be formed on the surface of at least one of the substrate 110, the first reflective element 150, the transparent colloid curing layer 160, and the second reflective element 170. In addition, at least one of the first reflective element 150 and the second reflective element 170 may include a plurality of light-reflecting elements arranged at an interval (see FIG. 4). Furthermore, the image capturing apparatus 200A may further include an optical collimator 190 (see FIG. 5) or a grating disposed on the sensor 130 and located between the transparent colloid curing layer 160 and the sensor 130. Reference may be made to the relevant paragraphs above for relevant descriptions, which will not be repeated here.

A manufacturing method of the image capturing apparatus according to the first embodiment and the second embodiment will be described below with reference to FIG. 10A to FIG. 13C. However, the manufacturing method of the image capturing apparatus according to the first embodiment and the second embodiment is not limited to the description below.

Figure 10A:
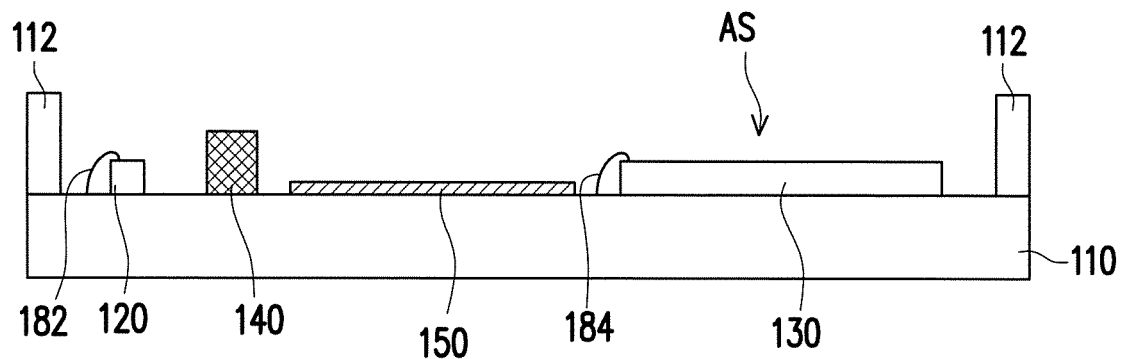
FIG. 10A to FIG. 10D are cross-sectional schematic diagrams illustrating one aspect of a manufacturing process of the image capturing apparatus according to the first embodiment of the invention.

FIG. 10A to FIG. 10D are cross-sectional schematic diagrams illustrating one aspect of a manufacturing process of the image capturing apparatus according to the first embodiment of the invention. Referring to FIG. 10A, the light source 120, the sensor 130, the light shielding element 140, and the first reflective element 150 are disposed on the substrate 110, wherein the relative configurational relations among the foregoing components are as described in the relevant paragraphs above and will not be repeatedly described here. In the exemplary embodiment, the connecting line 182, the connecting line 184, and the wall structure 112 are further disposed on the substrate 110, wherein the light source 120 is electrically connected to the circuit on the substrate 110 via the connecting line 182, the sensor 130 is electrically connected to the circuit on the substrate 110 via the connecting line 184, and the wall structure 112 and the substrate 110 form an accommodation space AS for accommodating the light source 120, the sensor 130, the light shielding element 140, and the first reflective element 150. In another embodiment, at least one of the light source 120 and the sensor 130 is connected to the circuit on the substrate 110 via a solder ball, and at least one of the connecting line 182 and the connecting line 184 may be omitted.

An order of disposing the light source 120, the sensor 130, the light shielding element 140, the first reflective element 150, the connecting line 182, the connecting line 184, and the wall structure 112 on the substrate 110 may be determined according to the needs and will not be further described here.

Figure 10B:
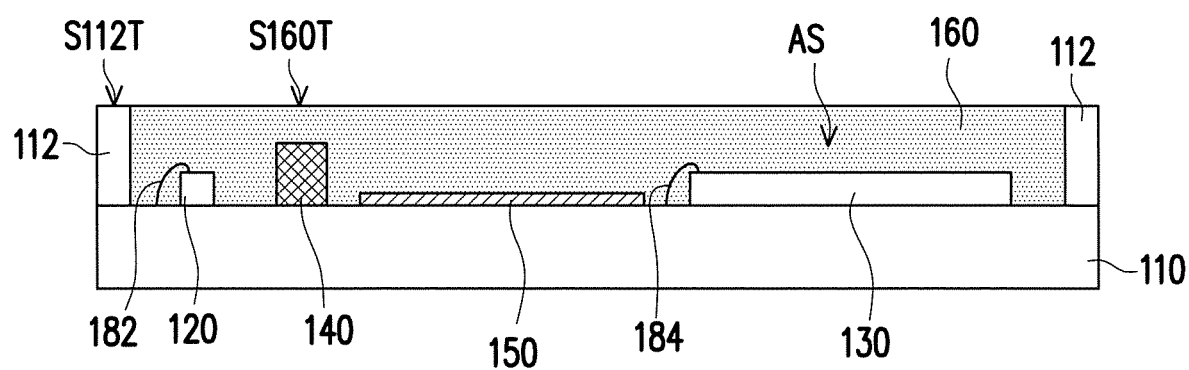

Referring to FIG. 10B, the transparent colloid curing layer 160 is formed on the substrate 110, wherein the transparent colloid curing layer 160 covers the light source 120, the sensor 130, the light shielding element 140, the first reflective element 150, the connecting line 182, and the connecting line 184.

Forming the transparent colloid curing layer 160 may include the following steps. First, a transparent colloid is formed on the substrate 110. The transparent colloid is a thermal-curing colloid or a photo-curing colloid. Then, the transparent colloid is cured through a heating process or a light irradiation process. The heating process may include a baking procedure. If the transparent colloid is cured by the heating process, the cured transparent colloid may undergo thermal expansion, such that a top surface of the cured transparent colloid is higher than the top surface S112T of the wall structure 112. Therefore, the cured transparent colloid is selectively thinned through a polishing procedure. In addition to reducing an overall thickness, the polishing procedure also causes the top surface S160T of the transparent colloid curing layer 160 to be more level (smooth and flat). In the exemplary embodiment, the top surface S160T of the transparent colloid curing layer 160 is flush with the top surface S112T of the wall structure 112. In other words, the top surface S160T of the transparent colloid curing layer 160 and the top surface S112T of the wall structure 112 have the same height, but the invention is not limited hereto.

It is noted that when the transparent colloid is filled into the accommodation space AS, the transparent colloid does not directly impact the components (e.g., the connecting line 182, the connecting line 184, the light source 120, etc.) located in the accommodation space AS due to protection of the wall structure 112, which improves issues such as broken wires and component offset and thereby enhances the yield and lowers the costs.

Figure 10C:
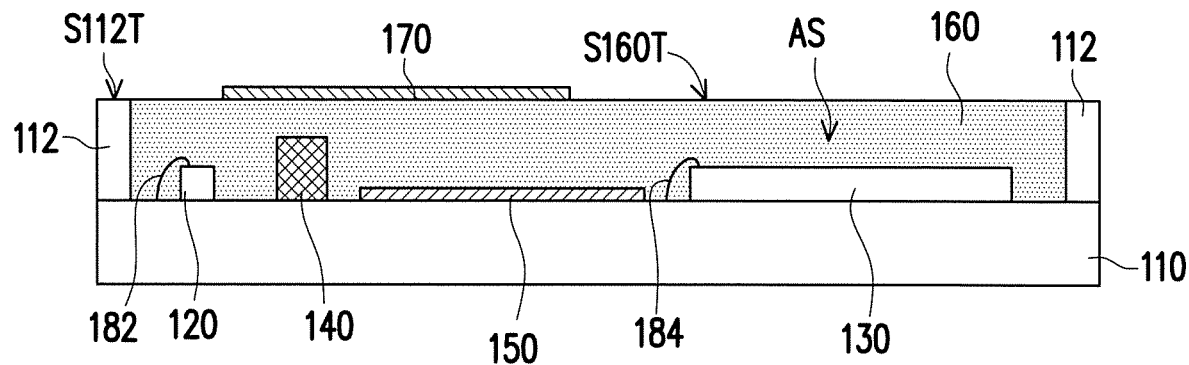

Referring to FIG. 10C, the second reflective element 170 is formed above the light shielding element 140. Specifically, the second reflective element 170 is disposed on the top surface S160T of the transparent colloid curing layer 160 and is located between the light source 120 and the sensor 130. Accordingly, the image capturing apparatus (e.g., the image capturing apparatus 100D of FIG. 6) is preliminarily completed.

Figure 10D:
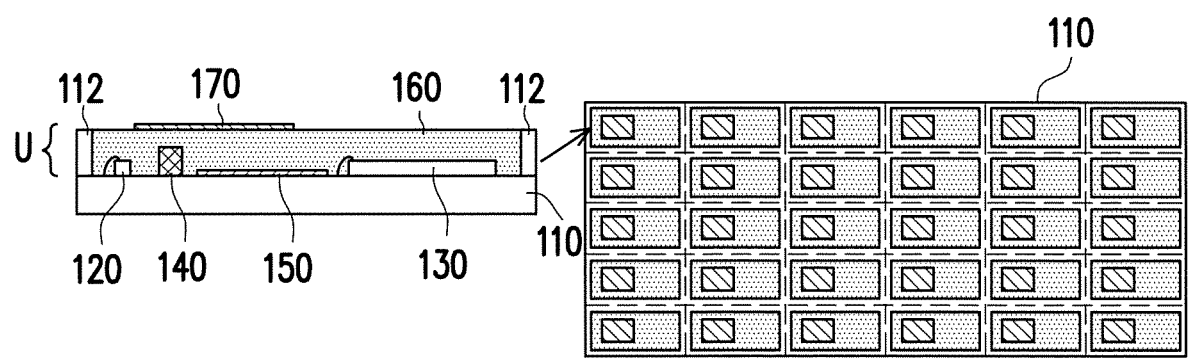

Referring to FIG. 10D, a plurality of image capturing units U (including the light source 120, the sensor 130, the light shielding element 140, the first reflective element 150, the transparent colloid curing layer 160, and the second reflective element 170) may be simultaneously manufactured on the substrate 110, and a plurality of image capturing apparatuses are split through a cutting process (e.g., cutting the substrate 110 along broken lines in FIG. 10D). In the cutting process, if the wall structure 112 is also removed, the image capturing apparatus 100 illustrated in FIG. 1 is formed. Conversely, if the wall structure 112 is retained, the image capturing apparatus 100D illustrated in FIG. 6 is formed.

After the second reflective element 170 is formed, a protective cover plate (not illustrated) or a protective film (not illustrated) may be further disposed on the transparent colloid curing layer 160 and the second reflective element 170. Moreover, in the step of manufacturing the image capturing apparatus, a plurality of microstructures may be further formed on the surface of at least one of the substrate 110, the first reflective element 150, the transparent colloid curing layer 160, and the second reflective element 170. For example, before the transparent colloid is filled into the accommodation space AS in FIG. 10B, the plurality of microstructures may be formed on the surface of the first reflective element 150 away from the substrate 110 in advance, so that the image capturing apparatus 100A illustrated in FIG. 3 is formed. Moreover, in the step of forming the first reflective element 150 of FIG. 10A and in the step of forming the second reflective element 170 of FIG. 10C, a plurality of light-reflecting elements may replace the one single light-reflecting element, so that the image capturing apparatus 100B illustrated in FIG. 4 is formed. Furthermore, before the transparent colloid curing layer 160 is formed in FIG. 10B, an optical collimator or a grating may be disposed on the sensor 130, so that the image capturing apparatus 100C illustrated in FIG. 5 is formed.

Figure 11A:
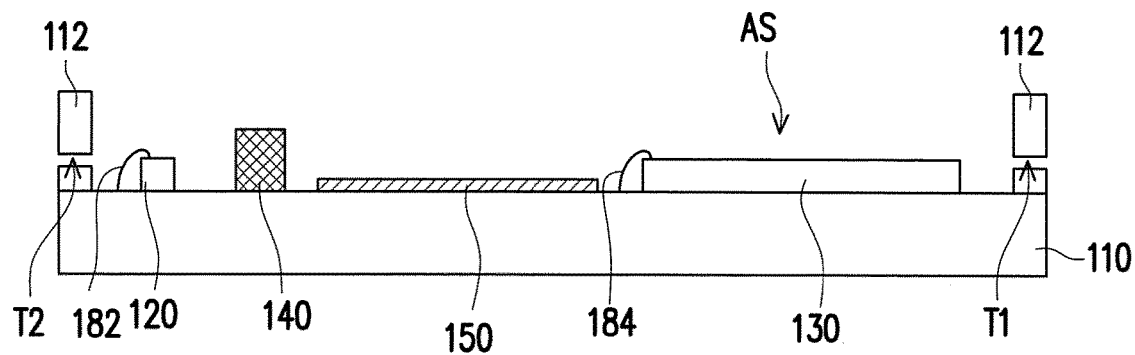
FIG. 11A to FIG. 11D are cross-sectional schematic diagrams illustrating another aspect of the manufacturing process of the image capturing apparatus according to the first embodiment of the invention.

FIG. 11A to FIG. 11D are cross-sectional schematic diagrams illustrating another aspect of the manufacturing process of the image capturing apparatus according to the first embodiment of the invention. Referring to FIG. 11A, the light source 120, the sensor 130, the light shielding element 140, the first reflective element 150, the connecting line 182, the connecting line 184, and the wall structure 112 are disposed on the substrate 110, wherein an order of disposing the foregoing components on the substrate 110 may be determined according to the needs and will not be further described here. Moreover, reference may be made to the relevant paragraphs above for descriptions of the relative configurational relations among the foregoing components, which will not be repeatedly described here.

In the exemplary embodiment, the wall structure 112 includes the first through-hole T1 and the second through-hole T2. The first through-hole T1 and the second through-hole T2 are respectively formed in portions of the wall structure 112 located on two opposite sides of the substrate 110.

Figure 11B:
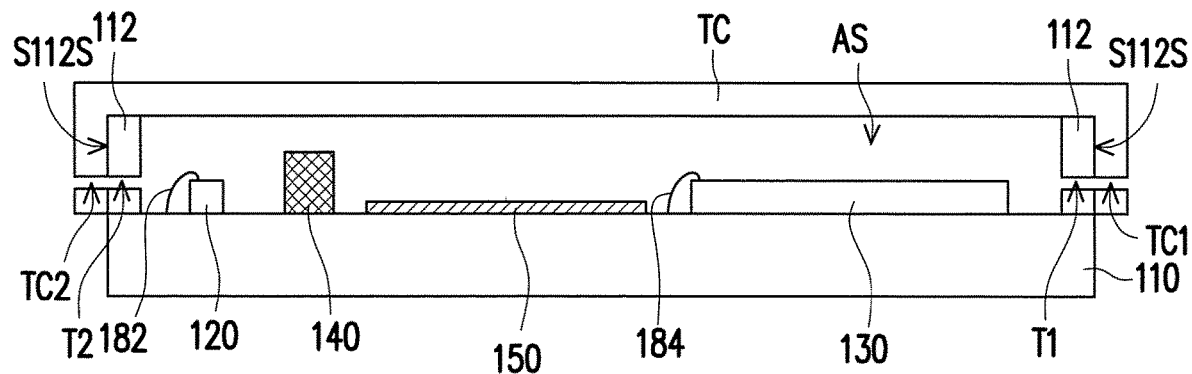

Referring to FIG. 11B, the light source 120, the sensor 130, the light shielding element 140, the first reflective element 150, the wall structure 112, the connecting line 182, and the connecting line 184 are covered with the transparent cover TC, wherein the transparent cover TC includes a gel injection hole TC1 and a vacuum-pumping hole TC2. The gel injection hole TC1 is adapted to fill the transparent colloid for forming the transparent colloid curing layer 160, and the vacuum-pumping hole TC2 is adapted to connect to a vacuum-pumping apparatus to pump out air in the accommodation space AS when the transparent colloid is filled in.

In the exemplary embodiment, the transparent cover TC further covers the side wall surface S112S of the wall structure 112, and the gel injection hole TC1 and the vacuum-pumping hole TC2 are respectively formed in a portion of the transparent cover TC covering the side wall surface S112S of the wall structure 112. The gel injection hole TC1 is connected to the first through-hole T1, such that the gel injection hole TC1 and the first through-hole T1 form a channel connecting an external space and the accommodation space AS. On the other hand, the vacuum-pumping hole TC2 is connected to the second through-hole T2, such that the vacuum-pumping hole TC2 and the second through-hole T2 form a channel connecting the external space and the accommodation space AS.

Figure 11C:
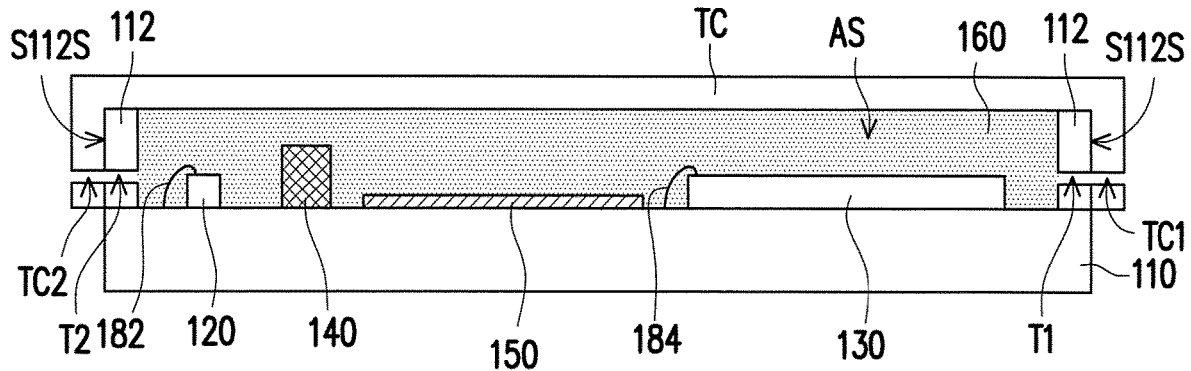

Referring to FIG. 11C, the transparent colloid curing layer 160 is formed on the substrate 110, wherein the transparent colloid curing layer 160 covers the light source 120, the sensor 130, the light shielding element 140, the first reflective element 150, the connecting line 182, and the connecting line 184.

Forming the transparent colloid curing layer 160 on the substrate 110 includes the following steps. The transparent colloid is injected into the accommodation space AS through the gel injection hole TC1 and the first through-hole T1, and the air in the accommodation space AS is pumped out through the vacuum-pumping hole TC2 and the second through-hole T2, wherein the gel injection and the air pumping may be performed at the same time. Accordingly, the transparent colloid injected into the accommodation space AS remains in a vacuum state, which helps to prevent formation of bubbles in the transparent colloid. In another embodiment, the substrate 110 is placed on a vibration surface. During gel injection, the vibration surface is caused to vibrate. The vibration causes the transparent colloid to be uniformly filled into the accommodation space AS. Then, the air in the accommodation space AS is discharged through the vacuum-pumping hole TC2 and the second through-hole T2, which prevents generation of bubbles and thereby achieves the effect of enhancing the overall yield.

In another embodiment, the gel injection hole TC1 and the vacuum-pumping hole TC2 may be formed in a portion of the transparent cover TC located on the substrate 110, so that it is not necessary to form the first through-hole T1 and the second through-hole T2 in the wall structure 112. In this framework, forming the transparent colloid curing layer 160 on the substrate 110 includes the following steps. The transparent colloid is injected into the accommodation space AS through the gel injection hole TC1, and the air in the accommodation space AS is pumped out through the vacuum-pumping hole TC2. Moreover, through vibration, the transparent colloid is uniformly filled into the accommodation space AS.

Figure 11D:
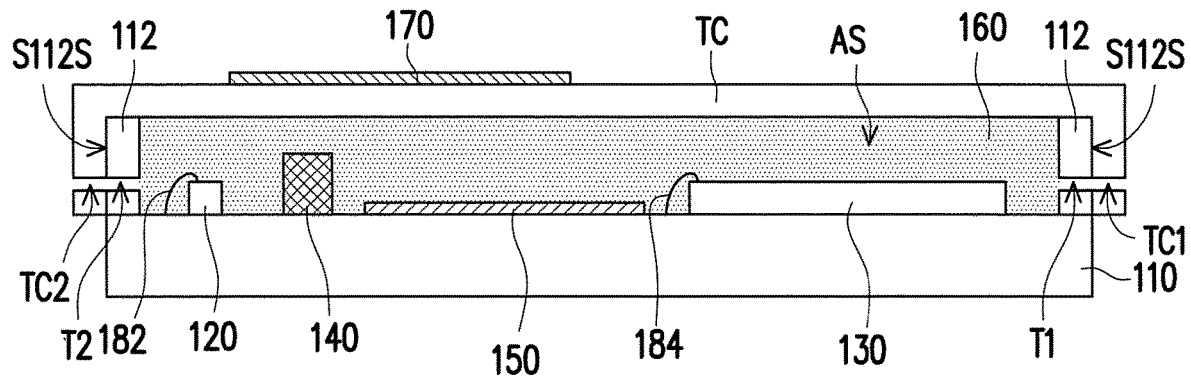

Referring to FIG. 11D, the second reflective element 170 is formed on the transparent cover TC. Accordingly, the image capturing apparatus (e.g., the image capturing apparatus 100E of FIG. 7) is preliminarily completed.

After the second reflective element 170 is formed, a protective cover plate (not illustrated) or a protective film (not illustrated) may be further disposed on the transparent cover TC and the second reflective element 170. Moreover, in the step of manufacturing the image capturing apparatus, a plurality of microstructures may be further formed on the surface of at least one of the substrate 110, the first reflective element 150, the transparent colloid curing layer 160, and the second reflective element 170. Moreover, in the step of forming the first reflective element 150 of FIG. 11A and in the step of forming the second reflective element 170 of FIG. 11D, a plurality of light-reflecting elements may replace the one single light-reflecting element. Furthermore, before the transparent cover TC is formed in FIG. 11B, an optical collimator or a grating may be disposed on the sensor 130.

Figure 12A:
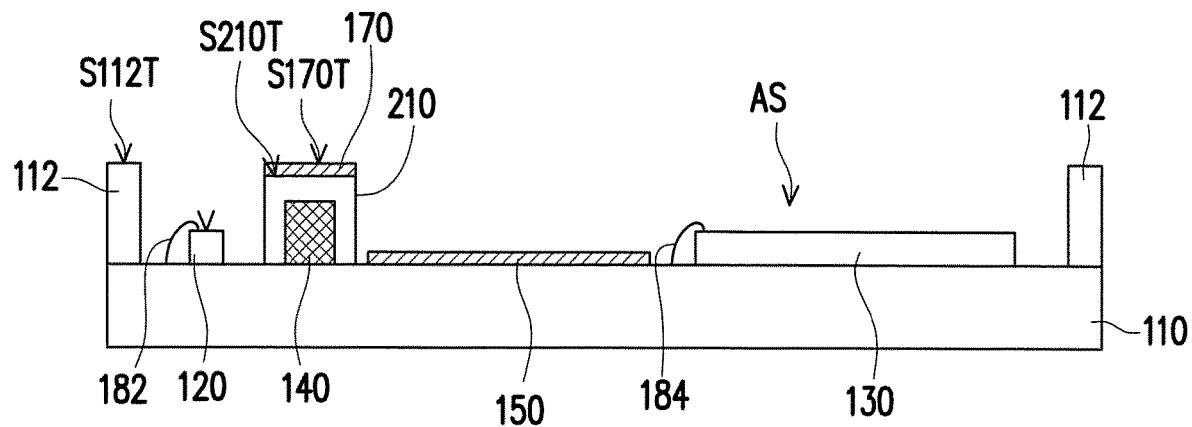
FIG. 12A and FIG. 12B are cross-sectional schematic diagrams illustrating one aspect of a manufacturing process of the image capturing apparatus according to the second embodiment of the invention.
Figure 12B:
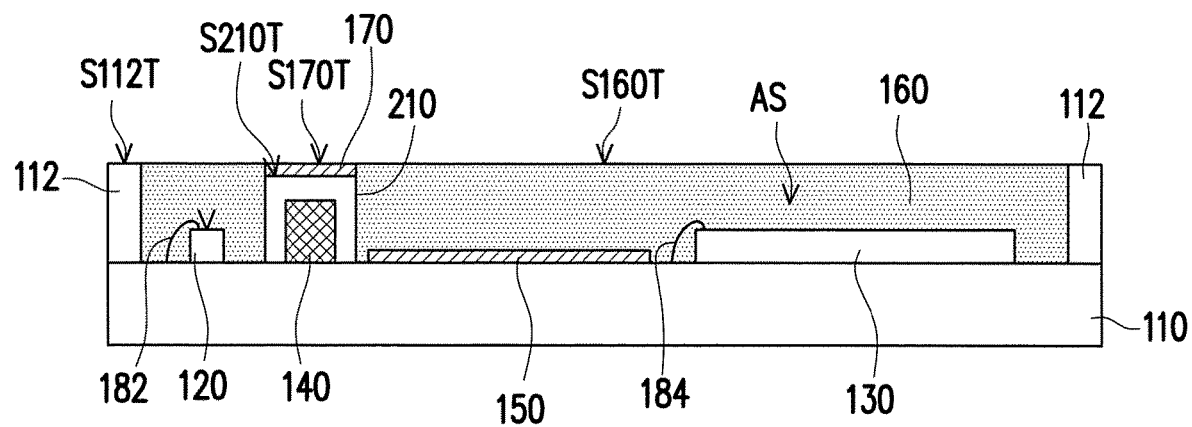

FIG. 12A and FIG. 12B are cross-sectional schematic diagrams illustrating one aspect of a manufacturing process of the image capturing apparatus according to the second embodiment of the invention. Referring to FIG. 12A, the light source 120, the sensor 130, the light shielding element 140, the first reflective element 150, the connecting line 182, the connecting line 184, and the wall structure 112 are disposed on the substrate 110, wherein an order of disposing the foregoing components on the substrate 110 may be determined according to the needs and will not be further described here. Moreover, after the light shielding element 140 is disposed on the substrate 110, the light shielding element 140 is covered with the transparent base 210, and the second reflective element 170 is formed on the top surface S210T of the transparent base 210. Reference may be made to the relevant paragraphs above for descriptions of the relative configurational relations among the foregoing components, which will not be repeatedly described here.

In the exemplary and feasible embodiment, the top surface S170T of the second reflective element 170 is flush with the top surface S112T of the wall structure 112. In other words, the top surface S170T of the second reflective element 170 and the top surface S112T of the wall structure 112 have the same height, but the invention is not limited hereto. In another embodiment, the top surface S170T of the second reflective element 170 may be lower than the top surface S112T of the wall structure 112.

Referring to FIG. 12B, the transparent colloid curing layer 160 is formed on the substrate 110, wherein the transparent colloid curing layer 160 covers the light source 120, the sensor 130, the light shielding element 140, the first reflective element 150, the connecting line 182, and the connecting line 184. Reference may be made to the relevant paragraphs above for relevant descriptions of forming the transparent colloid curing layer 160, which will not be repeated here.

In the framework where the top surface S170T of the second reflective element 170 is flush with the top surface S112T of the wall structure 112, the top surface S160T of the transparent colloid curing layer 160 may be configured to be flush with the top surface S170T of the second reflective element 170 and the top surface S112T of the wall structure 112, but the invention is not limited hereto. In the framework where the top surface S170T of the second reflective element 170 is lower than the top surface S112T of the wall structure 112, the top surface S160T of the transparent colloid curing layer 160 may be configured to be flush with the top surface S112T of the wall structure 112, and the transparent colloid curing layer 160 further covers the transparent base 210 and the second reflective element 170.

In an embodiment, the wall structure 112 is further removed through the cutting process to form the image capturing apparatus 200 illustrated in FIG. 8. Moreover, after the transparent colloid curing layer 160 is formed, a protective cover plate (not illustrated) or a protective film (not illustrated) may be further disposed on the transparent colloid curing layer 160 and the second reflective element 170. In addition, in the step of manufacturing the image capturing apparatus, a plurality of microstructures may be further formed on the surface of at least one of the substrate 110, the first reflective element 150, the transparent colloid curing layer 160, and the second reflective element 170. Furthermore, in the step of forming the first reflective element 150 and the second reflective element 170 of FIG. 12A, a plurality of light-reflecting elements may replace the one single light-reflecting element. Moreover, before the transparent colloid curing layer 160 is formed in FIG. 12B, an optical collimator, a grating or a fiber array (described in the prior application Ser. No. 15/151,471 filed by the Applicant) may be disposed on the sensor 130.

Figure 13A:
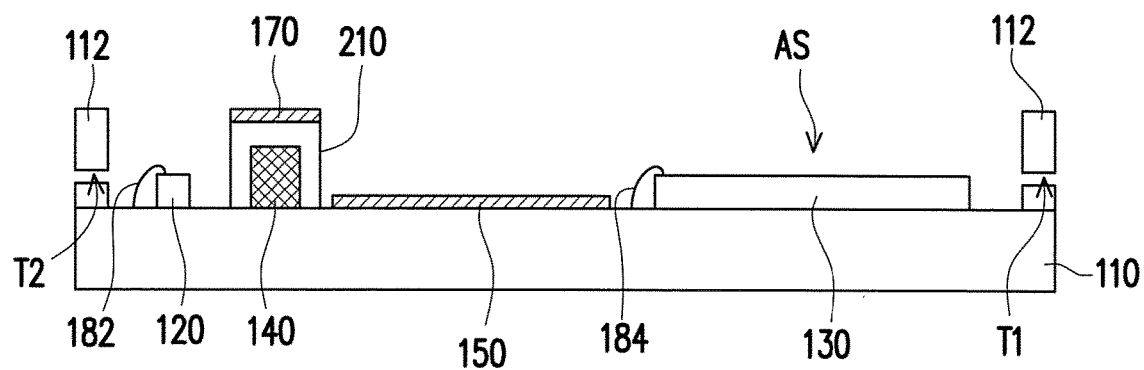
FIG. 13A to FIG. 13C are cross-sectional schematic diagrams illustrating another aspect of the manufacturing process of the image capturing apparatus according to the second embodiment of the invention.
Figure 13B:
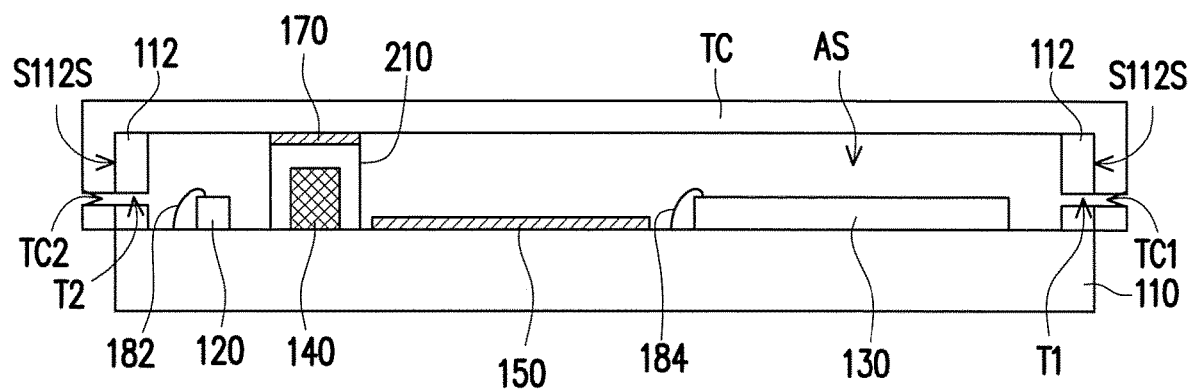
Figure 13C:
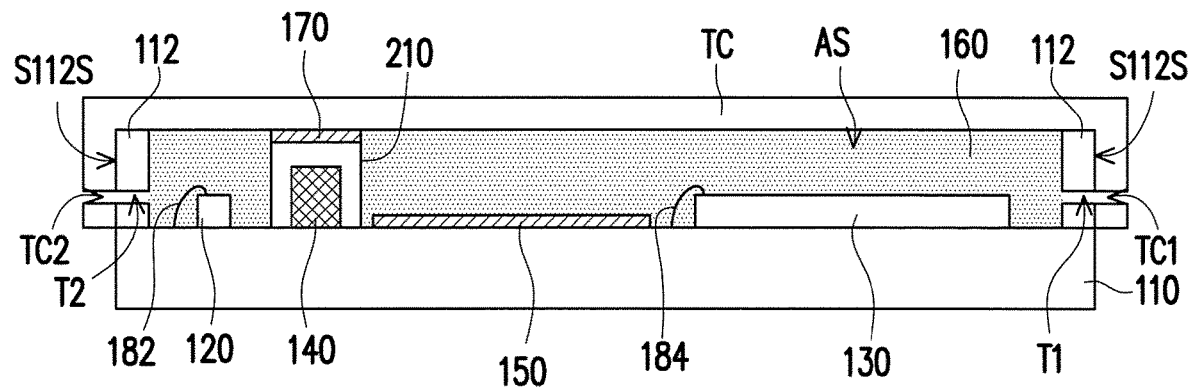

FIG. 13A to FIG. 13C are cross-sectional schematic diagrams illustrating another aspect of the manufacturing process of the image capturing apparatus according to the second embodiment of the invention. Referring to FIG. 13A, the light source 120, the sensor 130, the light shielding element 140, the first reflective element 150, the transparent base 210, the second reflective element 170, the connecting line 182, the connecting line 184, and the wall structure 112 are disposed on the substrate 110, wherein an order of disposing the foregoing components on the substrate 110 may be determined according to the needs and will not be further described here. Moreover, reference may be made to the relevant paragraphs above for descriptions of the relative configurational relations among the foregoing components, which will not be repeatedly described here.

In the exemplary embodiment, the wall structure 112 includes the first through-hole T1 and the second through-hole T2. The first through-hole T1 and the second through-hole T2 are respectively formed in portions of the wall structure 112 located on two opposite sides of the substrate 110.

Referring to FIG. 13B, the light source 120, the sensor 130, the light shielding element 140, the first reflective element 150, the transparent base 210, the second reflective element 170, the connecting line 182, the connecting line 184, and the wall structure 112 are covered with the transparent cover TC, wherein the transparent cover TC includes a gel injection hole TC1 and a vacuum-pumping hole TC2. The gel injection hole TC1 is adapted to fill the transparent colloid for forming the transparent colloid curing layer 160, and the vacuum-pumping hole TC2 is adapted to connect to a vacuum-pumping apparatus to pump out air in the accommodation space AS when the transparent colloid is filled in.

In the feasible embodiment, the transparent cover TC further covers a side wall surface S112S of the wall structure 112, and the gel injection hole TC1 and the vacuum-pumping hole TC2 are respectively formed in a portion of the transparent cover TC covering the side wall surface S112S of the wall structure 112. The gel injection hole TC1 is connected to the first through-hole T1, such that the gel injection hole TC1 and the first through-hole T1 form a channel (also known as path) connecting an external space and the accommodation space AS. On the other hand, the vacuum-pumping hole TC2 is connected to the second through-hole T2, such that the vacuum-pumping hole TC2 and the second through-hole T2 form a channel (also known as path) connecting the external space and the accommodation space AS.

Referring to FIG. 13C, the transparent colloid curing layer 160 is formed on the substrate 110, wherein the transparent colloid curing layer 160 covers the light source 120, the sensor 130, the light shielding element 140, the first reflective element 150, the connecting line 182, and the connecting line 184. Reference may be made to the relevant paragraphs above for relevant descriptions of forming the transparent colloid curing layer 160 on the substrate 110, which will not be repeated here. Accordingly, the image capturing apparatus (e.g., the image capturing apparatus 200A of FIG. 9) is preliminarily completed.

In the framework of FIG. 13C, the transparent cover TC protects the transparent colloid curing layer 160 and the second reflective element 170 located below. Therefore, it is not necessary to additionally include a protective cover plate (also known as protective cover sheet) or a protective film. Moreover, in the step of manufacturing the image capturing apparatus, a plurality of microstructures may be further formed on the surface of at least one of the substrate 110, the first reflective element 150, the transparent colloid curing layer 160, and the second reflective element 170. Furthermore, in the step of forming the first reflective element 150 and the second reflective element 170 of FIG. 13A, a plurality of light-reflecting elements may replace the one single light-reflecting element. Furthermore, before the transparent cover TC is disposed in FIG. 13B, an optical collimator, a grating or a fiber array (described in the prior application Ser. No. 15/151,471 filed by the Applicant) may be disposed on the sensor 130.

Figure 14:
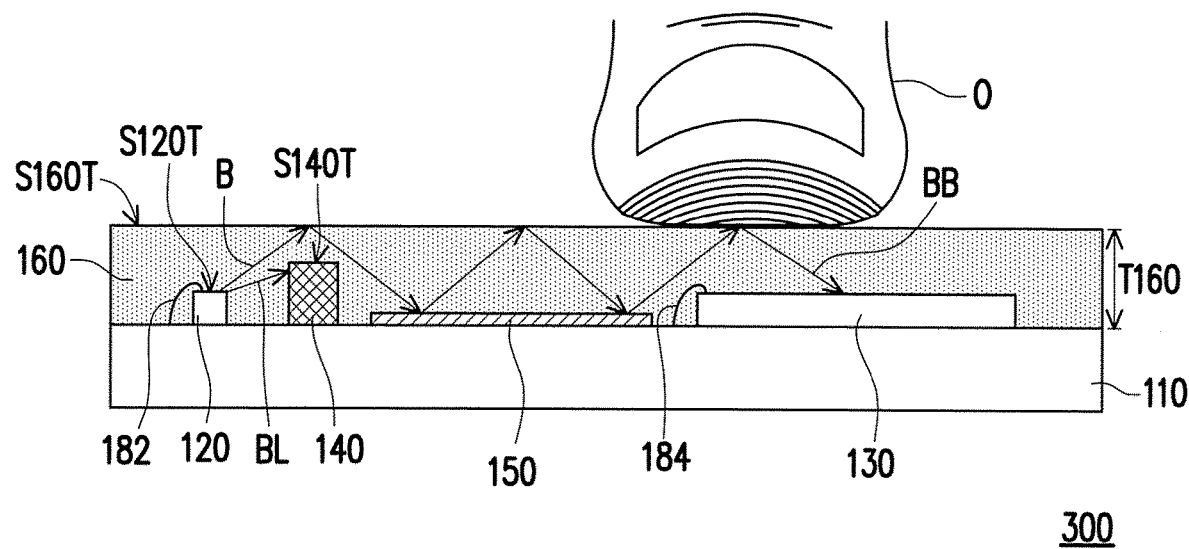
FIG. 14 is a cross-sectional schematic diagram illustrating one aspect of an image capturing apparatus according to a third embodiment of the invention.

FIG. 14 is a cross-sectional schematic diagram illustrating one aspect of an image capturing apparatus according to a third embodiment of the invention. Referring to FIG. 14, an image capturing apparatus 300 is similar to the image capturing apparatus 100 of FIG. 1, wherein the same components are represented by the same numerals and will not be repeatedly described below. The main differences between the image capturing apparatus 300 and the image capturing apparatus 100 of FIG. 1 are described below. In the image capturing apparatus 300, the second reflective element 170 in FIG. 1 is omitted. In this case, a portion of the beam B transmitted to the top surface S160T of the transparent colloid curing layer 160 is transmitted to the first reflective element 150 through internal reflection. Specifically, when a thickness T160 of the transparent colloid curing layer 160 is within a range from 0.3 mm to 1.8 mm, a portion of the beam transmitted to the top surface S160T of the transparent colloid curing layer 160 and having an angle (the angle included between the beam B and the top surface S160T) of no more than 45 degrees can be transmitted to the sensor 130 via multiple reflections between the top surface S160T and the first reflective element 150, while the other portion of the beam transmitted to the top surface S160T of the transparent colloid curing layer 160 and having an angle (the angle included between the beam B and the top surface S160T) larger than 45 degrees is refracted out of the transparent colloid curing layer 160.

Figure 15:
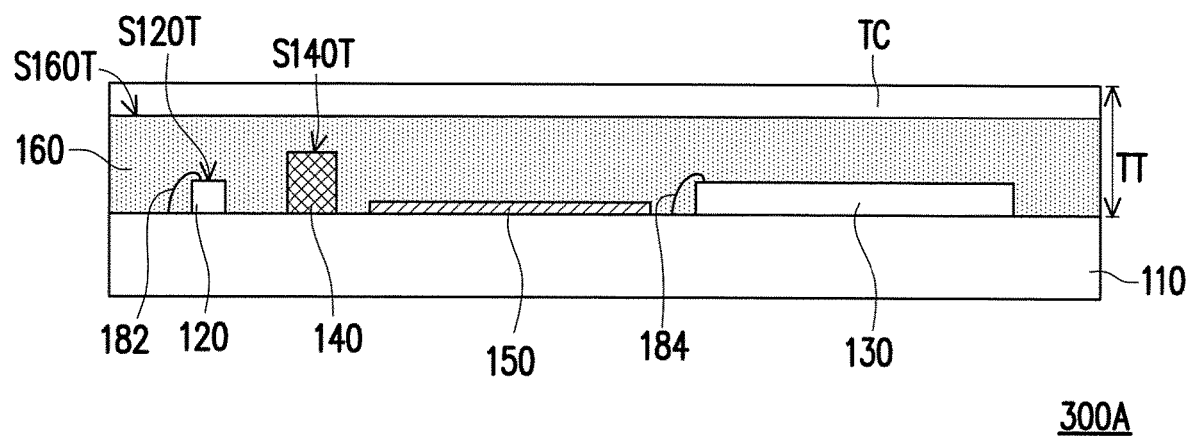
FIG. 15 is a cross-sectional schematic diagram illustrating another aspect of the image capturing apparatus according to the first embodiment of the invention.

FIG. 15 is a cross-sectional schematic diagram illustrating another aspect of the image capturing apparatus according to the first embodiment of the invention. Referring to FIG. 15, an image capturing apparatus 300A is similar to the image capturing apparatus 300 of FIG. 14, wherein the same components are represented by the same numerals and will not be repeatedly described below. The main differences between the image capturing apparatus 300A and the image capturing apparatus 300 of FIG. 14 are described below. In the image capturing apparatus 300A, the image capturing apparatus 300A further includes a transparent cover TC. The transparent cover TC is adapted to protect the elements located below. Besides, the transparent cover TC allows beam to pass through, so that the beam from the light source 120 can sequentially pass through the transparent colloid curing layer 160 and the transparent cover TC and be transmitted to the object in contact with the transparent cover TC, and the beam reflected by the object can sequentially pass through the transparent cover TC and the transparent colloid curing layer 160 and be transmitted to the sensor 130. For example, the transparent cover TC is a glass cover, but the invention is not limited thereto. In the case that the transparent cover TC is disposed on the transparent colloid curing layer 160 and covering the light source 120, the sensor 130, the light shielding element 140, the first reflective element 150, and the connecting lines 182 and 184, a total thickness TT of the transparent colloid curing layer 160 and the transparent cover TC is within a range from 0.3 mm to 1.8 mm to facilitate internal reflection, so that at least a portion of the beam from the light source 120 can be transmitted to the object in contact with the transparent cover TC an then be transmitted to the sensor 130.

In the framework of FIG. 14 and FIG. 15, a plurality of microstructures MS (see FIG. 3) may be formed on the surface of at least one of the substrate 110, the first reflective element 150, and the transparent colloid curing layer 160. In addition, the first reflective element 150 may include a plurality of light-reflecting elements arranged at an interval (see FIG. 4). Moreover, at least one of the image capturing apparatus 300 and the image capturing apparatus 300A may further include an optical collimator 190 (see FIG. 5), a grating or a fiber array (described in the prior application Ser. No. 15/151,471 filed by the Applicant) disposed on the sensor 130 and located between the transparent colloid curing layer 160 and the sensor 130. Furthermore, at least one of the image capturing apparatus 300 and the image capturing apparatus 300A may further include the wall structure 112 disposed on the substrate 110 (see FIG. 6). Reference may be made to the relevant paragraphs above for relevant descriptions, which will not be repeated here.

In summary of the above, in the image capturing apparatus of an embodiment of the invention, since the light shielding element is disposed between the light source and the sensor, the beam from the light source is prevented from directly irradiating to the sensor. Moreover, since the first reflective element and the top surface of the transparent colloid curing layer contribute to multiple reflections of the beam in the transparent colloid curing layer, the beam transmitted in the image capturing apparatus is more uniformized, and the object thereby receives light in a more uniform manner. Accordingly, the image capturing apparatus of an embodiment of the invention exhibits excellent image capturing quality. In an embodiment, the image capturing apparatus further includes the second reflective element to enhance the intensity of the beam transmitted to the sensor. In another embodiment, the image capturing apparatus further includes the protective cover plate or the protective film to protect the components located below (e.g., the transparent colloid curing layer or the second reflective element) against scratching, for example. In another embodiment, a plurality of microstructures are formed on the surface of at least one of the substrate, the first reflective element, the transparent colloid curing layer, and the second reflective element to increase a reflection amount of the beam and cause the beam to be more uniformized. In another embodiment, at least one of the first reflective element and the second reflective element includes the plurality of light-reflecting elements arranged at an interval to uniformize the beam. In another embodiment, the image capturing apparatus further includes the optical collimator, the grating or the fiber array to collimate the beam transmitted to the sensor. Moreover, in the manufacturing method of the image capturing apparatus of an embodiment of the invention, since the light source, the light shielding element, the first reflective element, and the sensor occupy a certain amount of space, the amount of the transparent colloid required is reduced, which thereby lowers the manufacturing costs. In an embodiment, the wall structure is formed before gel injection to improve issues such as broken wires and component offset during gel injection and thereby enhance the yield and lower the costs. In another exemplary embodiment, the air in the accommodation space is pumped out while the gel is injected to prevent generation of bubbles. Moreover, through vibrating the substrate, the transparent colloid is uniformly filled into the accommodation space to thereby achieve the effect of enhancing the overall yield.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:
1. An image capturing apparatus comprising:
   a substrate;
   a light source disposed on the substrate;
   a sensor disposed on the substrate and located next to the light source;
   a light shielding element disposed on the substrate and located between the light source and the sensor,
   a first reflective element disposed on the substrate and located between the light shielding element and the sensor, and
   a transparent colloid curing layer disposed on the substrate and covering the sensor, the light source, the light shielding element, and the first reflective element,
   wherein the first reflective element and the sensor are not overlapped in a normal direction of the substrate.

2. The image capturing apparatus according to claim 1, wherein a pulse width modulation circuit is integrated in the sensor.

3. The image capturing apparatus according to claim 1, wherein a thickness of the transparent colloid curing layer is within a range from 0.3 mm to 1.8 mm.

4. The image capturing apparatus according to claim 1, further comprising:
   a transparent cover disposed on the transparent colloid curing layer and covering the light source, the sensor, the light shielding element, and the first reflective element, wherein a total thickness of the transparent colloid curing layer and the transparent cover is within a range from 0.3 mm to 1.8 mm.

5. The image capturing apparatus according to claim 1, further comprising:
   a second reflective element disposed above the light shielding element and located between the light source and the sensor.

6. The image capturing apparatus according to claim 5, wherein a plurality of microstructures are formed on a surface of at least one of the substrate, the first reflective element, the transparent colloid curing layer, and the second reflective element.

7. The image capturing apparatus according to claim 5, wherein the second reflective element is disposed on a top surface of the transparent colloid curing layer.

8. The image capturing apparatus according to claim 5, further comprising:
   a transparent base disposed on the substrate and covering the light shielding element, wherein the second reflective element is disposed on a top surface of the transparent base.

9. The image capturing apparatus according to claim 5, wherein at least one of the first reflective element and the second reflective element comprises a plurality of light-reflecting elements arranged at an interval.

10. The image capturing apparatus according to claim 5, further comprising:
a transparent base disposed on the substrate and covering the light shielding element, wherein the second reflective element is disposed on a top surface of the transparent base, and at least one of the first reflective element and the second reflective element comprises a plurality of light-reflecting elements arranged at an interval.

11. The image capturing apparatus according to claim 1, further comprising:
a plurality of connecting lines respectively connecting between the substrate and the sensor and between the substrate and the light source; and
a wall structure disposed on the substrate, wherein the wall structure and the substrate form an accommodation space for accommodating the light source, the sensor, the light shielding element, and the first reflective element.

12. The image capturing apparatus according to claim 11, further comprising:
a transparent cover disposed on the transparent colloid curing layer and covering the light source, the sensor, the light shielding element, the first reflective element, the connecting lines, and the wall structure, wherein the transparent cover comprises a gel injection hole and a vacuum-pumping hole.

13. The image capturing apparatus according to claim 1, further comprising:
an optical collimator or a grating disposed on the sensor and located between the transparent colloid curing layer and the sensor.

14. A manufacturing method of an image capturing apparatus, comprising:
disposing a light source, a sensor, a light shielding element, and a first reflective element on a substrate, wherein the sensor is located next to the light source, the light shielding element is located between the light source and the sensor, and the first reflective element is located between the light shielding element and the sensor, and
forming a transparent colloid curing layer on the substrate, wherein the transparent colloid curing layer covers the sensor, the light source, the light shielding element, and the first reflective element, and wherein the first reflective element and the sensor are not overlapped in a normal direction of the substrate.

15. The manufacturing method of an image capturing apparatus according to claim 14, wherein forming the transparent colloid curing layer comprises:
forming a transparent colloid on the substrate;
curing the transparent colloid; and
thinning the cured transparent colloid to form the transparent colloid curing layer.

16. The manufacturing method of an image capturing apparatus according to claim 14, further comprising:
forming a second reflective element above the light shielding element, wherein the second reflective element is located between the light source and the sensor.

17. The manufacturing method of an image capturing apparatus according to claim 16, further comprising:
forming a plurality of microstructures on a surface of at least one of the substrate, the first reflective element, the transparent colloid curing layer, and the second reflective element.

18. The manufacturing method of an image capturing apparatus according to claim 16, wherein forming the second reflective element above the light shielding element comprises:
forming the second reflective element on the transparent colloid curing layer after forming the transparent colloid curing layer.

19. The manufacturing method of an image capturing apparatus according to claim 16, further comprising:
covering the light source, the sensor, the light shielding element, and the first reflective element with a transparent cover before forming the transparent colloid curing layer, wherein forming the second reflective element above the light shielding element comprises:
forming the second reflective element on the transparent cover after forming the transparent colloid curing layer.

20. The manufacturing method of an image capturing apparatus according to claim 16, further comprising:
covering the light source, the sensor, the light shielding element, and the first reflective element with a transparent cover before forming the transparent colloid curing layer, wherein forming the second reflective element above the light shielding element comprises:
covering the light shielding element with a transparent base and forming the second reflective element on a top surface of the transparent base, before disposing the transparent cover.

21. The manufacturing method of an image capturing apparatus according to claim 14, further comprising:
forming a wall structure on the substrate before forming the transparent colloid curing layer, wherein the wall structure and the substrate form an accommodation space for accommodating the light source, the sensor, the light shielding element, and the first reflective element;
forming a plurality of connecting lines on the substrate before forming the transparent colloid curing layer, wherein the connecting lines respectively connect between the substrate and the sensor and between the substrate and the light source; and
covering the light source, the sensor, the light shielding element, the first reflective element, the wall structure, and the connecting lines with a transparent cover before forming the transparent colloid curing layer and after forming the connecting lines, wherein the transparent cover covers a side wall surface of the wall structure, and the transparent cover comprises a gel injection hole and a vacuum-pumping hole,
wherein forming the transparent colloid curing layer on the substrate comprises:
injecting a transparent colloid into the accommodation space through the gel injection hole; and
pumping out air in the accommodation space through the vacuum-pumping hole.

22. The manufacturing method of an image capturing apparatus according to claim 21, wherein the gel injection hole and the vacuum-pumping hole are located in a portion of the transparent cover covering the side wall surface of the wall structure, and the wall structure comprises a first through-hole connecting the gel injection hole and a second through-hole connecting the vacuum-pumping hole,
wherein forming the transparent colloid curing layer on the substrate comprises:
injecting the transparent colloid into the accommodation space through the gel injection hole and the first through-hole; and pumping out air in the accommodation space through the vacuum-pumping hole and the second through-hole.

23. The manufacturing method of an image capturing apparatus according to claim 14, further comprising:
   disposing an optical collimator or a grating on the sensor before forming the transparent colloid curing layer.

* * * * *